(12) United States Patent
Qiang et al.

(10) Patent No.: US 11,996,913 B2
(45) Date of Patent: May 28, 2024

(54) MULTI-USER PAIRING AND SINR CALCULATION BASED ON RELATIVE BEAM POWER FOR CODEBOOK-BASED DL MU-MIMO

(71) Applicant: Telefonaktiebolaget LM Ericsson (publ), Stockholm (SE)

(72) Inventors: Yongquan Qiang, Ottawa (CA); Jianguo Long, Kanata (CA); Hong Ren, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 454 days.

(21) Appl. No.: 17/286,649

(22) PCT Filed: Oct. 18, 2018

(86) PCT No.: PCT/IB2018/058116
§ 371 (c)(1),
(2) Date: Apr. 19, 2021

(87) PCT Pub. No.: WO2020/079475
PCT Pub. Date: Apr. 23, 2020

(65) Prior Publication Data
US 2021/0376889 A1 Dec. 2, 2021

(51) Int. Cl.
*H04B 7/0452* (2017.01)
*H04B 7/06* (2006.01)
(Continued)

(52) U.S. Cl.
CPC ......... *H04B 7/0452* (2013.01); *H04B 7/0695* (2013.01); *H04L 5/0048* (2013.01); *H04W 24/08* (2013.01)

(58) Field of Classification Search
None
See application file for complete search history.

(56) References Cited

U.S. PATENT DOCUMENTS

| 2014/0050277 | A1 | 2/2014 | Wu et al. | |
| 2016/0352012 | A1* | 12/2016 | Foo | H04L 25/03343 |
| 2021/0076225 | A1* | 3/2021 | Kim | H04W 80/02 |

FOREIGN PATENT DOCUMENTS

| CN | 107980209 A1 | 5/2018 |
| EP | 3193463 A1 | 7/2017 |
| WO | 2018172823 A1 | 9/2018 |

OTHER PUBLICATIONS

Author Unknown, "3rd Generation Partnership Project; Technical Specification Group Radio Access Network; Evolved Universal Terrestrial Radio Access (E-UTRA); Physical channels and modulation (Release 15)," 3GPP TS 36.211 V15.0.0, Dec. 2017, 3GPP Organizational Partners, 219 pages.

(Continued)

*Primary Examiner* — Hong Shao
(74) *Attorney, Agent, or Firm* — Sage Patent Group

(57) ABSTRACT

Systems and methods are disclosed herein for multi-user pairing and, in some embodiments, Signal to Interference plus Noise Ratio (SINR) calculation in a cellular communications system. In some embodiments, a method performed in a base station of a cellular communications system to perform downlink scheduling for Multi-User Multiple Input Multiple Output (MU-MIMO) comprises, for each User Equipment (UE) of a plurality of UEs considered for MU-MIMO UE pairing, obtaining a relative beam power at the UE for each of the plurality of beams. The relative beam power at the UE for each beam is a value that represents a relative beam power of the beam at the UE relative to a beam power of a strongest of the plurality of beams at the UE. The method further comprises selecting a MU-MIMO UE pairing based on the obtained relative beam powers.

22 Claims, 13 Drawing Sheets

(51) Int. Cl.
    *H04L 5/00*     (2006.01)
    *H04W 24/08*    (2009.01)

(56) References Cited

OTHER PUBLICATIONS

Author Unknown, "3rd Generation Partnership Project; Technical Specification Group Radio Access Network; Evolved Universal Terrestrial Radio Access (E-UTRA); Physical layer procedures (Release 15)," 3GPP TS 36.213 V15.0.0, Dec. 2017, 3GPP Organizational Partners, 493 pages.

Author Unknown, "3rd Generation Partnership Project; Technical Specification Group Radio Access Network;NR; Physical layer procedures for data (Release 15)," 3GPP TS 38.214 V15.0.0, Dec. 2017, 3GPP Organizational Partners, 71 pages.

International Search Report and Written Opinion for International Patent Application No. PCT/IB2018/058116, dated May 10, 2019, 13 pages.

First Office Action dated Oct. 17, 2023 for Chinese Patent Application No. 201880098787.6, 13 pages.

\* cited by examiner

MULTI-USER PAIRING AND SINR CALCULATION BASED ON RELATIVE BEAM POWER FOR CODEBOOK-BASED DL MU-MIMO

This application is a 35 U.S.C. § 371 national phase filing of International Application No. PCT/IB2018/058116, filed Oct. 18, 2018, the disclosure of which is incorporated herein by reference in its entirety.

TECHNICAL FIELD

The present disclosure relates to multi-user pairing and Signal to Interference Plus Noise Ratio (SINR) in a cellular communications system.

BACKGROUND

An Active Antenna System (AAS) is one of the key technologies adopted by Fourth Generation (4G) Long Term Evolution (LTE) and Fifth Generation (5G) New Radio (NR) to enhance the wireless network performance and capacity by using Full Dimension Multiple Input Multiple Output (FD-MIMO) or Massive Multiple Input Multiple Output (M-MIMO). A typical AAS consists of a two-dimensional antenna element array with M rows, N columns, and K polarizations (K=2 in case of cross-polarization) as shown in FIG. 1.

A typical application of an AAS is to perform codebook-based downlink (DL) Multi-User Multiple Input Multiple Output (MU-MIMO), which allows the same time-frequency resources to be shared by multiple User Equipments (UEs) at same time by using a predefined a set of beams, which are defined by corresponding precoding vectors. The optimum Precoding Matrix Index (PMI) for a particular UE is obtained from a PMI report from the UE or estimated at the base station (i.e., the enhanced or evolved Node B (eNB) for LTE or the next generation Node B (gNB) for NR) using uplink (UL) reference signals.

With codebook-based DL MU-MIMO, the co-channel interference from co-scheduled UEs has significant impacts on performance. The co-channel interference comes from the side-lobe leakage of the beam (i.e., precoding vector) of one UE to the main-lobe of the beam(s) (i.e., precoding vector(s)) of the other, co-scheduled UE(s), as shown in FIG. 2.

FIG. 2 shows the beam radiation pattern for a Discrete Fourier Transform (DFT)-based codebook (index 0) with eight (8) transmit antennas in a Line of Sight (LOS) channel model. There are multiple side-lobes to each side of the main lobe. Leakages from the side-lobes might be dominant interference to other co-scheduled UEs scheduled on beams located at side-lobe directions and with high Single User Multiple Input Multiple Output (SU-MIMO) Signal to Interference plus Noise Ratio (SINR). Thus, one of challenges of DL codebook-based MU-MIMO is to have MU-MIMO UE pairing and SINR calculation schemes at the base station that find the best MU-MIMO UE pairing and accurate SINR for link adaptation.

Two existing MU-MIMO UE pairing (also referred to herein as multi-user pairing) and SINR calculation mechanisms that utilize existing codebook feedback as summarized below.

"Type-I" Codebook-Based

In Release 15 of NR [1], the "'TypeI-SinglePanel'" codebook allows a UE to report a single best PMI with a SU-MIMO hypothesis as shown in FIG. 3. The corresponding Channel Quality Indication (CQI) with SU-MIMO hypothesis is also reported.

With this single best PMI and SU-MIMO CQI report, the only way to pair a UE for MU-MIMO is based on the distance of PMI. That is, the UEs with maximum PMI distance are selected for co-scheduling with an assumption that the side-lobe interference is decreased with PMI distance increase. In fact, this is not always true. For instance, FIG. 4 is an illustration of side-lobe interference related to PMI distance. As can be seen in FIG. 4, UE0 at boresight suffers more interference from UE2 with PMI #5 than UE1 with PMI #4, as an example. Furthermore, there is no way to quantify the interference from paired UEs.

Furthermore, since interference from co-scheduled UEs is unknown, it is not possible to obtain an accurate SINR using SU-MIMO CQI report. Usually, the MU-MIMO SINR values are guessed based on the SU-MIMO SINR values with power split, which results in inaccurate link adaptation.

"Type-II" Codebook-Based

In Release 15 NR [1], the "Type-II" codebook allows the UE to report up to four orthogonal beams per polarization with quantized amplitude and phase. With the multi-beam Channel State Information (CSI) report, the DL channel is known by the gNB. Then, Zero-Forcing (ZF), or Minimum Mean Square Error (MMSE) based multi-user pairing and SINR calculation can be used for DL MU-MIMO. However, this approach suffers from problems. First, the number of beams with a type-II CSI report is limited to four. The information on other beams is unknown. Furthermore, the amplitude and phase are quantized, and these quantized values are not sufficiently accurate for multi-user pairing and SINR calculation. Second, it is too complicated to do multi-user pairing and SINR calculation with ZF or MMSE based algorithms, in which the matrix inverse is needed per hypothesis. Third, the type-II CSI feedback is dependent on UE capability. It is not supported by UEs of releases prior to Release 15. Lastly, the overhead required for the "type-II" CSI report is very high.

In light of the discussion above, there is a need for systems and methods of MU-MIMO UE pairing and SINR calculation that address the aforementioned problems.

SUMMARY

Systems and methods are disclosed herein for multi-user pairing and, in some embodiments, Signal to Interference plus Noise Ratio (SINR) calculation in a cellular communications system. In some embodiments, a method performed in a base station of a cellular communications system to perform downlink scheduling for Multi-User Multiple Input Multiple Output (MU-MIMO), comprises, for each User Equipment (UE) of a plurality of UEs considered for MU-MIMO UE pairing, obtaining a relative beam power at the UE for each of the plurality of beams. The relative beam power at the UE for each beam is a value that represents a relative beam power of the beam at the UE relative to a beam power of a strongest of the plurality of beams at the UE. The method further comprises selecting a MU-MIMO UE pairing based on the relative beam powers obtained for the plurality of UEs, the MU-MIMO UE pairing comprising a set of UEs $\{UE_1, \ldots, UE_N\}$ on a respective set of beams $\{b_1, \ldots, b_N\}$, where N is an integer greater than 1, the set of UEs $\{UE_1, \ldots, UE_N\}$ is a subset of the plurality of UEs considered for the MU-MIMO UE pairing, and the set of beams $\{b_1, \ldots, b_N\}$ is a subset of or all of a plurality of beams available for downlink (DL) transmission at the base station. In this manner, an optimal MU-MIMO UE pairing can be selected taking into consideration the co-channel interference from beams selected for the other UEs in the pairing.

In some embodiments, for each UE of the plurality of UEs, obtaining the relative beam power at the UE for each of the plurality of beams comprises receiving, from the UE, the relative beam power at the UE for each of the plurality of beams.

In some embodiments, for each UE of the plurality of UEs, obtaining the relative beam power at the UE for each of the plurality of beams comprises receiving, from the UE, the relative beam power at the UE for each of a subset of the plurality of beams. Further, in some embodiments, for each UE of the plurality of UEs, the subset of the plurality of beams for which the relative beam powers are obtained from the UE are those beams for which the relative beam power is greater than a reporting threshold. In some embodiments, for each UE of the plurality of UEs, obtaining the relative beam power at the UE for each of the plurality of beams further comprises setting the relative beam power for each of the plurality of beams other than those comprised in the subset of the plurality of beams to a default value.

In some embodiments, for each UE of the plurality of UEs, obtaining the relative beam power at the UE for each of the plurality of beams comprises receiving, from the UE, beam powers measured at the UE for at least a subset of the plurality of beams, respectively, and computing, for the UE, the relative beam powers for the plurality of beams based on the beam powers measured at the UE.

In some embodiments, for each UE of the plurality of UEs considered for MU-MIMO UE pairing, obtaining the relative beam power at the UE for each of the plurality of beams comprises obtaining measurements at the base station of uplink (UL) reference signals transmitted by the UE and estimating beam powers at the UE for each of the plurality of beams based on measurements.

In some embodiments, selecting the MU-MIMO UE pairing comprises selecting the MU-MIMO UE pairing such that each pair of UEs, $UE_k$ and $UE_n$ in the set of UEs $\{UE_1, \ldots, UE_N\}$, satisfies:

$$RBP_k(i,j) > Th \text{ and } RBP_n(j,i) > Th$$

where:

$$RBP_k(i, j) = \frac{RBP_k(i)}{RBP_k(j)} \text{ and } RBP_nC(j, i) = \frac{RBP_n(j)}{RBP_n(i)}$$

and:
  $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
  $RBP_k(j)$ is the relative beam power at the $UE_k$ for the beam, selected for the $UE_n$ in the MU-MIMO UE pairing relative to the beam power of the strongest of the plurality of beams at the $UE_k$;
  $RBP_n(j)$ is the relative beam power at the $UE_n$ for the beam, selected for the $UE_n$ in the MU-MIMO UE pairing relative to the beam power of the strongest of the plurality of beams at the $UE_n$;
  $RBP_n(i)$ is the relative beam power at the $UE_n$ for the beam, $b_i$, selected for the $UE_k$ in the MU-MIMO UE pairing relative to the beam power of the strongest of the plurality of beams at the $UE_n$; and
  Th is a predefined threshold value.

In some embodiments, the method further comprises calculating a MU-MIMO SINR for a k-th UE in the set of UEs $\{UE_1, \ldots, UE_N\}$ in the MU-MIMO UE pairing based on a Single User Multiple Input Multiple Output (SU-MIMO) SINR for the k-th UE and a Relative Beam Power (RBP) sum value for the k-th UE. The RBP sum value for the k-th UE ($UE_k$) is defined as:

$$\sum_{j \neq i} RBP_k(j, i)$$

where $$RBP_k(j, i) = \frac{RBP_k(j)}{RBP_k(i)}$$

and
  $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$; and
  $RBP_k(j)$ is the relative beam power at the $UE_k$ for the beam, selected for the $UE_n$ in the MU-MIMO UE pairing relative to the beam power of the strongest of the plurality of beams at the $UE_k$.

In some embodiments, the method further comprises calculating a MU-MIMO SINR for a k-th UE in the set of UEs $\{UE_1, \ldots, UE_N\}$ in the MU-MIMO UE pairing based on a SU-MIMO SINR for the k-th UE and a RBP sum value for the k-th UE in accordance with:

$$SINR^{(MU)}(k) = \frac{SINR^{(SU)}(k) \times RBP_k(i)/K}{1 + SINR^{(SU)}(k) \times RBP_k(i) \times \sum_{j \neq i} RBP_k(j, i)/K}$$

where the RBP sum value for the k-th UE, $UE_k$, is defined as:

$$\sum_{j \neq i} RBP_k(j, i)$$

and $$RBP_k(j, i) = \frac{RBP_k(j)}{RBP_k(i)}$$

where:
  $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
  $RBP_k(j)$ is the relative beam power at the $UE_k$ for the beam, selected for the $UE_n$ in the MU-MIMO UE pairing relative to the beam power of the strongest of the plurality of beams at the $UE_k$;
  $SINR^{(SU)}(k)$ is a SU-MIMO SINR for the k-th UE; and
  K is a total number of UEs in the MU-MIMO UE pairing.

In some embodiments, the method further comprises performing link adaptation for the k-th UE in the MU- MIMO UE pairing based on the calculated MU-MIMO SINR for the k-th UE in the MU-MIMO UE pairing.

Embodiments of a base station are also disclosed. In some embodiments, a base station for a cellular communications system for performing DL scheduling for MU-MIMO comprise a radio interface and processing circuitry whereby the base station is operable to, for each UE of a plurality of UEs considered for MU-MIMO UE pairing, obtain a relative beam power at the UE for each of the plurality of beams. The relative beam power at the UE for each beam is a value that represents a relative beam power of the beam at the UE relative to a beam power of a strongest of the plurality of beams at the UE. The base station is further operable to select a MU-MIMO UE pairing based on the relative beam powers obtained for the plurality of UEs, the MU-MIMO UE pairing comprising a set of UEs $\{UE_1, \ldots, UE_N\}$ on a respective set of beams $\{b_1, \ldots, b_N\}$, where N is an integer greater than 1, the set of UEs $\{UE_1, \ldots, UE_N\}$ is a subset of the plurality of UEs considered for the MU-MIMO UE pairing, and the set of beams $\{b_1, \ldots, b_N\}$ is a subset of or all of a plurality of beams available for DL transmission at the base station.

In some embodiments, in order to obtain the relative beam power at the UE for each of the plurality of beams, the base station is further operable to, via the radio interface and the processing circuitry, receive the relative beam power at the UE for each of the plurality of beams from the UE.

In some embodiments, in order to obtain the relative beam power at the UE for each of the plurality of beams, the base station is further operable to, via the radio interface and the processing circuitry, receive the relative beam power at the UE for each of a subset of the plurality of beams from the UE. In some embodiments, for each UE of the plurality of UEs, the subset of the plurality of beams for which the relative beam powers are obtained from the UE are those beams for which the relative beam power is greater than a predefined or preconfigured reporting threshold. In some embodiments, in order to obtain the relative beam power at the UE for each of the plurality of beams, the base station is further operable to, via the processing circuitry, set the relative beam power for each of the plurality of beams other than those comprised in the subset of the plurality of beams to a default value.

In some embodiments, in order to obtain the relative beam power at the UE for each of the plurality of beams, the base station is further operable to, via the radio interface and the processing circuitry: receive beam powers measured at the UE for at least a subset of the plurality of beams, respectively, from the UE, and compute the relative beam powers for the plurality of beams for the UE based on the beam powers measured at the UE.

In some embodiments, in order to obtain the relative beam power at the UE for each of the plurality of beams, the base station is further operable to, via the radio interface and the processing circuitry, obtain measurements at the base station of UL reference signals transmitted by the UE and estimate beam powers at the UE for each of the plurality of beams based on measurements.

In some embodiments, in order to select the MU-MIMO UE pairing, the base station is further operable to, via the processing circuitry, select the MU-MIMO UE pairing such that each pair of UEs, $UE_k$ and $UE_n$ in the set of UEs $\{UE_1, \ldots, UE_N\}$, satisfies:

$$RBP_k(i,j) > Th \text{ and } RBP_n(j,i) > Th$$

where:

$$RBP_k(i,j) = \frac{RBP_k(i)}{RBP_k(j)} \text{ and } RBP_n(j,i) = \frac{RBP_n(j)}{RBP_n(i)}$$

and:
$RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
$RBP_k(j)$ is the relative beam power at the $UE_k$ for the beam, selected for the $UE_n$ in the MU-MIMO UE pairing relative to the beam power of the strongest of the plurality of beams at the $UE_k$;
$RBP_n(j)$ is the relative beam power at the $UE_n$ for the beam, $b_j$, selected for the $UE_n$ in the MU-MIMO UE pairing relative to the beam power of the strongest of the plurality of beams at the $UE_n$;
$RBP_n(i)$ is the relative beam power at the $UE_n$ for the beam, $b_i$, selected for the $UE_k$ in the MU-MIMO UE pairing relative to the beam power of the strongest of the plurality of beams at the $UE_n$; and
Th is a predefined threshold value.

In some embodiments, via the processing circuitry, the base station is further operable to calculate a MU-MIMO SINR for a k-th UE in the set of UEs $\{UE_1, \ldots, UE_N\}$ in the MU-MIMO UE pairing based on a SU-MIMO SINR for the k-th UE and a RBP sum value for the k-th UE, the RBP sum value for the k-th UE, $UE_k$, being defined as:

$$\sum_{j \neq i} RBP_k(j, i)$$

where:
$RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$; and
$RBP_k(j)$ is the relative beam power at the $UE_k$ for the beam, $b_i$, selected for the $UE_n$ in the MU-MIMO UE pairing relative to the beam power of the strongest of the plurality of beams at the $UE_k$.

In some embodiments, via the processing circuitry, the base station is further operable to calculate a MU-MIMO SINR for a k-th UE in the set of UEs $\{UE_1, \ldots, UE_N\}$ in the MU-MIMO UE pairing based on a SU-MIMO SINR for the k-th UE and a RBP sum value for the k-th UE in accordance with:

$$SINR^{(MU)}(k) = \frac{SINR^{(SU)}(k) \times RBP_k(i)/K}{1 + SINR^{(SU)}(k) \times RBP_k(i) \times \sum_{j \neq i} RBP_k(j,i)/K}$$

where the RBP sum value for the k-th UE, $UE_k$, is defined as:

$$\sum_{j \neq i} RBP_k(j, i)$$

where $$RBP_k(j, i) = \frac{RBP_k(j)}{RBP_k(i)}$$

and:
- $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
- $RBP_k(j)$ is the relative beam power at the $UE_k$ for the beam, selected for the $UE_n$ in the MU-MIMO UE pairing relative to the beam power of the strongest of the plurality of beams at the $UE_k$;
- $SINR^{(SU)}(k)$ is a SU-MIMO SINR for the k-th UE; and
- K is a total number of UEs in the MU-MIMO UE pairing.

In some embodiments, via the radio interface and the processing circuitry, the base station is further operable to perform link adaptation for the k-th UE in the MU-MIMO UE pairing based on the calculated MU-MIMO SINR for the k-th UE in the MU-MIMO UE pairing.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
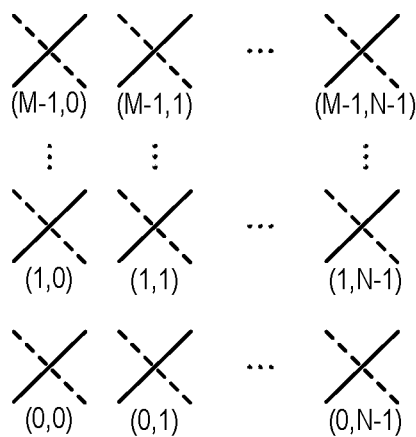
FIG. 1 illustrates a typical Active Antenna System (AAS) consisting of a two-dimensional antenna element array with M rows, N columns, and K polarizations (K=2 in case of cross-polarization)
Figure 2:
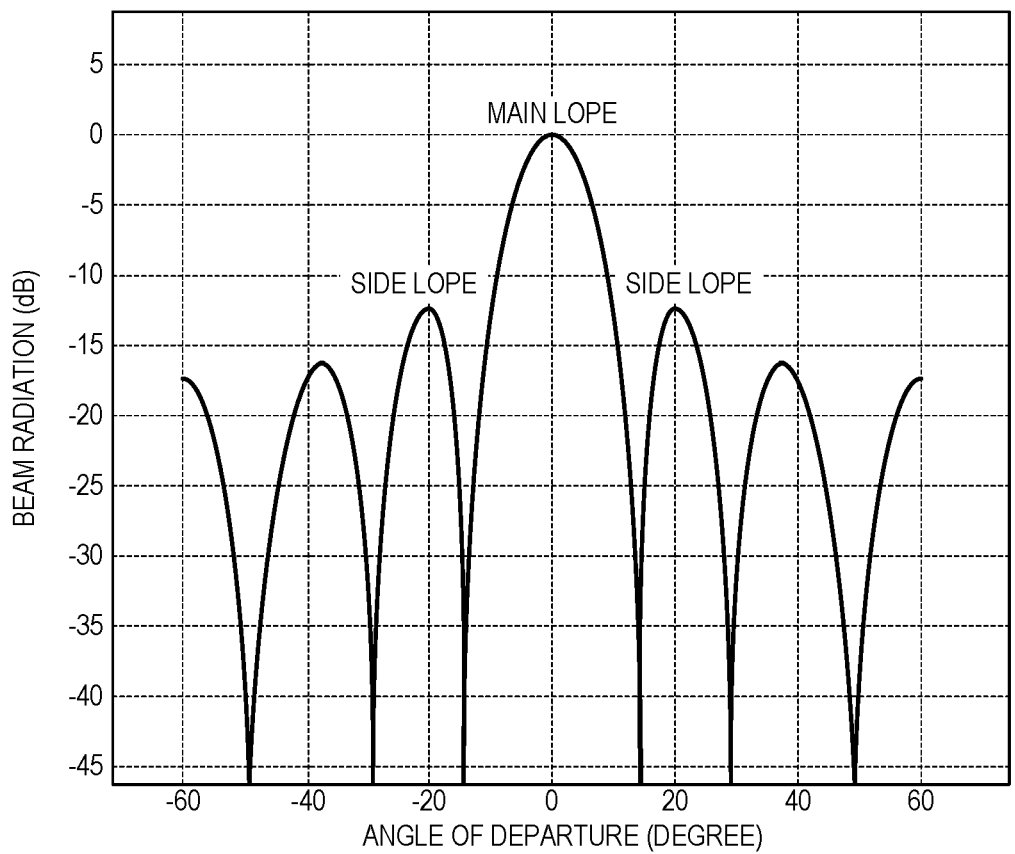
FIG. 2 illustrates the beam radiation pattern for a Discrete Fourier Transform (DFT)-based codebook (index 0) with eight (8) transmit antennas in a Line of Sight (LOS) channel model.
Figure 3:
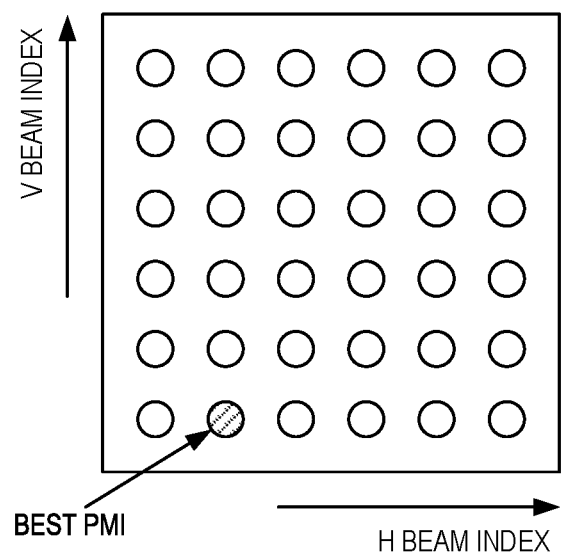
FIG. 3 illustrates how a User Equipment (UE) can report a single best Precoding Matrix Index (PMI) with a Single User Multiple Input Multiple Output (SU-MIMO) hypothesis.
Figure 4:
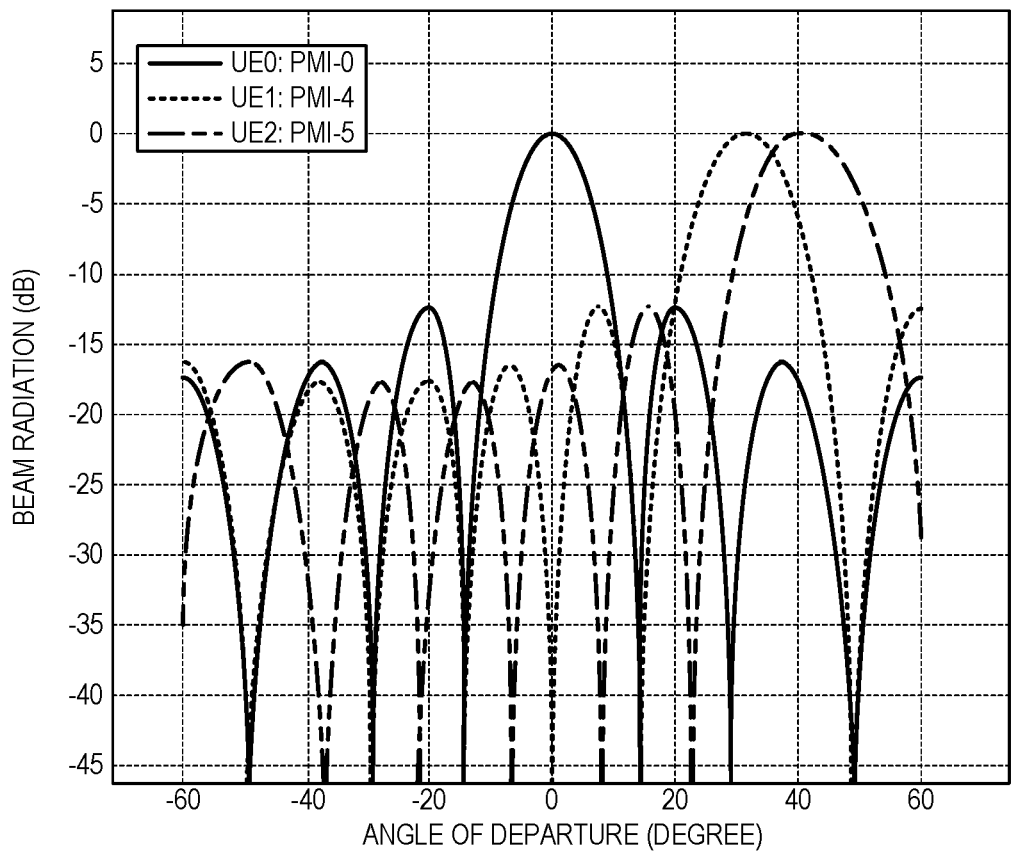
FIG. 4 illustrates side-lobe interference related to PMI distance.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods for downlink (DL) Multi-User Multiple Input Multiple Output (MU-MIMO) UE pairing (i.e., multi-user pairing) are disclosed. In some embodiments, Multi-User (MU) Signal to Interference plus Noise Ratio (SINR) is also computed and, in some embodiments, used to perform a DL transmission (e.g., provide link adaptation for the DL transmission).

In some embodiments, a network node (e.g., a base station) performs DL MU-MIMO pairing and, optionally, MU-SINR calculation for codebook-based DL MU-MIMO. As described below in detail, in some embodiments, the network node obtains Relative Beam Power (RBP) values for multiple beams (i.e., multiple predefined precoding vectors that define the multiple beams). These beams are the transmit beams that can be used for DL MU-MIMO transmission. In some embodiments, the network node obtains at least some of the RBP values from the respective UEs (e.g., via full or partial RBP reports). In some other embodiments, the network node estimates the RBP values based on measurements on uplink reference signals (e.g., Demodulation Reference Signal (DMRS) or Sounding Reference Signal (SRS)) transmitted by the respective UEs. The network node pairs multiple UEs for a DL MU-MIMO transmission based on pair-wise RBP values. In some embodiments, the network node selects the pairing such that the pair-wise RBP values for any two UEs in the pairing are both greater than a predefined or preconfigured threshold. In some embodiments, the network node also calculates MU-MIMO SINR values for the UEs in the pairing based on respective Single User Multiple Input Multiple Output (SU-MIMO) SINR values (e.g., SU-MIMO SINR values with power split plus backoff) and respective RBP sum values. In some embodiments, the network node performs the DL MU-MIMO transmission using the calculated MU-MIMO SINR values for the UEs in the pairing. In particular, in some embodiments, for each UE in the pairing, the network node performs link adaptation for that UE using the MU-MIMO SINR value calculated for that UE.

While not limited to or by any particular advantage, embodiments of the present disclosure provide a number of advantages over existing MU-MIMO UE pairing and SINR calculation schemes. For example, embodiments of the present disclosure find the best MU-MIMO UE pairing. As another example, embodiments of the present disclosure provide accurate SINR estimation with co-scheduling interference considered for codebook-based DL MU-MIMO.

Figure 5:
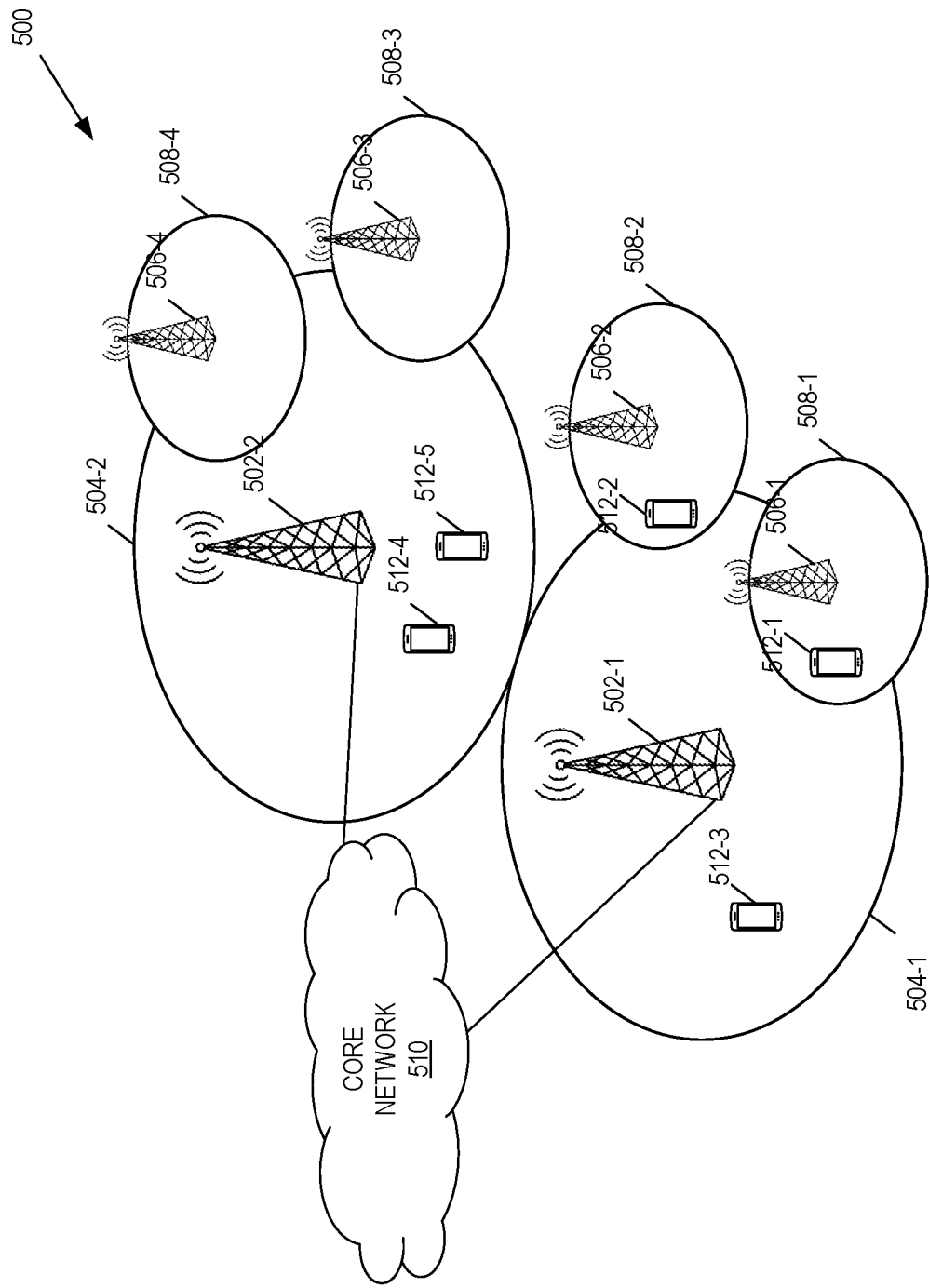
FIG. 5 illustrates one example of a cellular communications network according to some embodiments of the present disclosure.

In this regard, FIG. 5 illustrates one example of a cellular communications network 500 according to some embodiments of the present disclosure. In the embodiments described herein, the cellular communications network 500 is a 5G NR network; however, the present disclosure is not limited thereto. In this example, the cellular communications network 500 includes base stations 502-1 and 502-2, which in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The base stations 502 (and optionally the low power nodes 506) are connected to a core network 510.

The base stations 502 and the low power nodes 506 provide service to UEs 512-1 through 512-5 in the corresponding cells 504 and 508. The UEs 512-1 through 512-5 are generally referred to herein collectively as UEs 512 and individually as UE 512.

Figure 6:
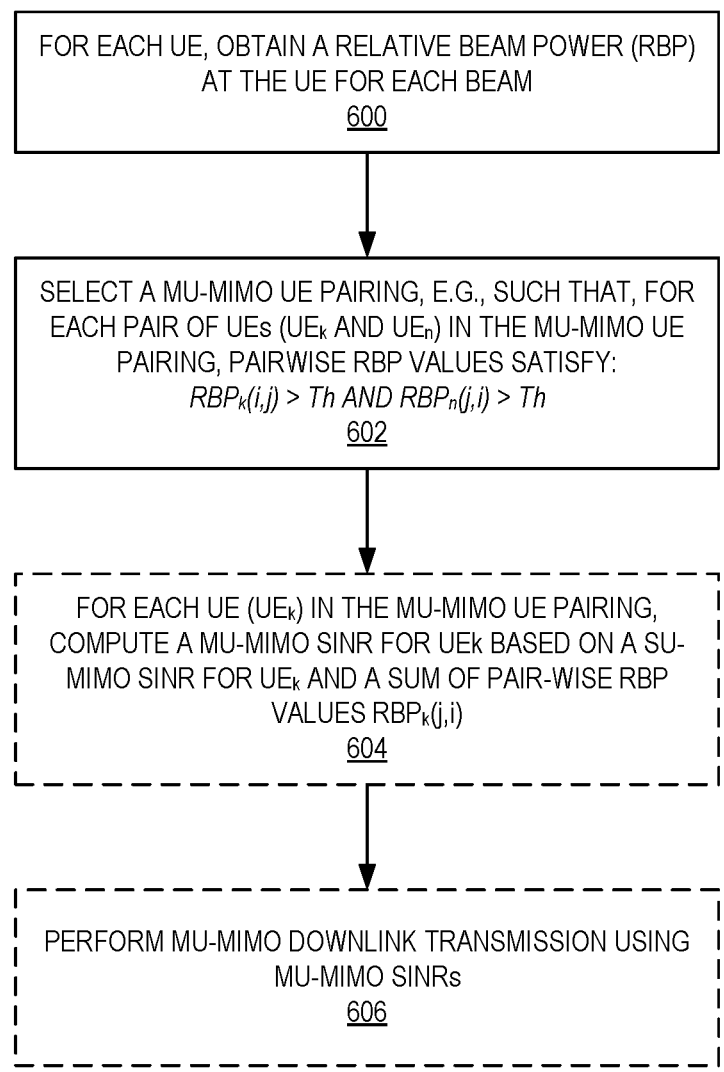
FIG. 6 is a flow chart that illustrates the operation of a base station in accordance with some embodiments of the present disclosure.

FIG. 6 illustrates the operation of a network node (e.g., a base station 502) to perform DL MU-MIMO UE pairing and, optionally, MU-MIMO SINR calculation in accordance with some embodiments of the present disclosure. Note that optional steps are represented by dashed boxes. As illustrated, the network node obtains, for each UE (e.g., UE 512) of multiple UEs (e.g., a group of UEs to be considered for DL MU-MIMO UE pairing), a RBP at the UE for each beam of multiple beams available for use for a DL MU-MIMO transmission) (step 600). More specifically, for a given UE referred to as $UE_k$, a RBP at $UE_k$ of an i-th beam relative to a j-th beam is defined by:

$$RBP_k(i, j) = \frac{P_k(i)}{P_k(j)} \tag{1}$$

where $P_k(i)$ is a power of the i-th beam observed at $UE_k$ and $P_k(j)$ is a power of the j-th beam observed at $UE_k$. The RBP of the i-th beam relative to the strongest beam power observed at $UE_k$ is defined by:

$$RBP_k(i) = \frac{P_k(i)}{P_k(i_{max})} \tag{2}$$

where $P_k(i_{max})$ is the strongest beam power observed by $UE_k$. Then, the RBP of the i-th beam relative to the j-th beam for $UE_k$ can be expressed by:

$$RBP_k(i, j) = \frac{RBP_k(i)}{RBP_k(j)} \tag{3}$$

In step 600, for each $UE_k$ in the set of UEs to be considered for the DL MU-MIMO pairing, the network node obtains $RBP_k(i)$ values for each beam, $b_i$, in the set of beams available for use for DL MU-MIMO.

The network node obtains the $RBP_k(i)$ values using any suitable mechanism. For example, in some embodiments, each $UE_k$ computes its $RBP_k(i)$ values for all of the beams and sends the computed $RBP_k(i)$ values to the network node in a report(s). As another example, in some other embodiments, each $UE_k$ computes its $RBP_k(i)$ values for all of the beams and sends a subset of the computed $RBP_k(i)$ values to the network node in a report(s). This subset can be, e.g., those $RBP_k(i)$ values that are greater than a predefined or preconfigured reporting threshold. In this case, the network node can set any unreported $RBP_k(i)$ values to a default value (e.g., 0). As yet another example, in some other embodiments, each $UE_k$ measures the beam power observed at $UE_k$ for each beam and sends the measured beam power values or a subset of the measured beam powers (e.g., those beam power values that are greater than a predefined or preconfigured reporting threshold) to the network node in a report(s), where the network node then uses the reported beam power values to compute the $RBP_k(i)$ values. Any unreported beam power values can be set to a default value (e.g., 0). As a final example, in some other embodiments, for each $UE_k$, the network node obtains measurements of uplink reference signals (e.g., DMRS or SRS) transmitted by $UE_k$ and estimates the $RBP_k(i)$ values for $UE_k$ based on those measurements. Note that, for all embodiments, $RBP_k(i)$ values may be wideband or obtained for different sub-bands, e.g., with unit of decibels (dB).

The network node selects a MU-MIMO UE pairing for a DL MU-MIMO transmission based on the obtained $RBP_k(i)$ values (step 602). One example of a scheme for selecting the MU-MIMO UE pairing based on the obtained $RBP_k(i)$ values will now be described. Note that this scheme is only an example. Other schemes and variations of this scheme may be used. More specifically, for $UE_k$ with beam $b_i$ (i.e., the i-th beam) for MU-MIMO precoding to be paired with $UE_n$ with beam $b_j$ (i.e., the j-th beam) for MU-MIMO precoding, the ratio of the desired signal power of $UE_k$ to the interference power from paired $UE_n$ can be calculated by:

$$SIR_k = \frac{P_k(i)}{P_k(j)} = RBP_k(i, j) \qquad (4)$$

So, for a given $UE_k$ and any other $UE_n$ to be paired, the pair-wise RBP values $RBP_k(i,j)$ and $RBP_n(j,i)$ should each satisfy a predefined (e.g., preconfigured) threshold (Th) in order to minimize the co-channel interference from co-scheduled UEs. That is, $$RBP_k(i,j) > Th \text{ AND } RBP_n(j,i) > Th \qquad (5)$$

In some embodiments, the RBP values obtained in step 600 are the RBP values relative to the strongest beam at the respective UE. In this case, $$RBP_k(i, j) = \frac{RBP_k(i)}{RBP_k(j)} \text{ and } RBP_n(j, i) = \frac{RBP_n(j)}{RBP_n(i)} \qquad (6)$$

where:
- $RBP_k(i)$ is the relative beam power at $UE_k$ for the beam, $b_i$, selected for $UE_k$ in the MU-MIMO UE pairing,
- $RBP_k(j)$ is the relative beam power at $UE_k$ for the beam, selected for $UE_n$ in the MU-MIMO UE pairing,
- $RBP_n(j)$ is the relative beam power at $UE_n$ for the beam, selected for $UE_n$ in the MU-MIMO UE pairing,
- $RBP_n(i)$ is the relative beam power at $UE_n$ for the beam direction, $b_i$, selected for $UE_k$ in the MU-MIMO UE pairing, and
- Th is a predefined (e.g., preconfigured) threshold value that is the minimum separation of two UEs to be paired for codebook-based DL MU-MIMO.

In some other embodiments, the RBP values obtained in step 600 are the RBP values of beam i relative to beam j relative to the strongest beam at the respective UE. In this case, $$RBP_k(i, j) = \frac{P_k(i)}{P_k(j)} \text{ and } RBP_n(j, i) = \frac{P_n(j)}{P_n(i)} \qquad (7)$$

where the beam power values may be reported by the UEs or computed (e.g., estimated) by the network node.

Thus, in step 602, the network node selects the MU-MIMO UE pairing for the DL MU-MIMO transmission, where the MU-MIMO UE pairing includes a set of UEs $\{UE_1, \ldots, UE_N\}$ on a respective set of beams $\{b_1, \ldots, b_N\}$, where N is an integer greater than 1 and is the number of UEs in the MU-MIMO UE pairing, the set of UEs $\{UE_1, \ldots, UE_N\}$ is a subset of the UEs considered for the MU-MIMO UE pairing, and the set of beams $\{b_1, \ldots, b_N\}$ is a subset of or all of the available beams. Further, the MU-MIMO pairing is selected such that, for each pair of UEs ($UE_k$ and $UE_n$) in the set of UEs $\{UE_1, \ldots, UE_N\}$:

$$RBP_k(i,j) > Th \text{ and } RBP_n(j,i) > Th.$$

Optionally, the network node computes, for each $UE_k$ in the selected MU-MIMO UE pairing, a MU-MIMO SINR for $UE_k$ based on a SU-MIMO SINR for $UE_k$ and a sum of pair-wise RBP values $RBP_k(j, i)$ where beam $b_i$ is the beam selected for $UE_k$ in the MU-MIMO UE pairing and the sum of $RBP_k(j, i)$ values is for all beams $j \neq 1$ (step 604). More specifically, for $UE_k$ with beam $b_i$ for MU-MIMO precoding where $UE_k$ is co-scheduled with other UEs with beam j ($j \neq i$), the MU-MIMO SINR of UE(k) can be calculated by:

$$SINR^{(MU)}(k) = \frac{P_k(i)/K}{I+N+\Sigma_{j \neq i}P_k(j)/K} =$$

$$= \frac{1/K}{\frac{I+N}{P_k(i_{max})} \times \frac{P_k(i_{max})}{P_k(i)} + \frac{1}{K} \times \Sigma_{j \neq i}\frac{P_k(j)}{P_k(i)}}$$

$$= \frac{1/K}{\frac{1}{SINR^{(SU)}(i) \times RBP_k(i)} + \frac{\Sigma_{j \neq i}RBP_k(j, i)}{K}}$$

$$= \frac{SINR^{(SU)}(k) \times RBP_k(i)/K}{1 + SINR^{(SU)}(k) \times RBP_k(i) \times \Sigma_{j \neq i}RBP_k(j, i)/K}$$

where $SINR^{(SU)}(k) = \frac{P_k(i_{max})}{I+N}$ is the SU-MIMO SINR of $UE_k$ from a UE CSI report (e.g., "Type-I" CSI report [1]) with corresponding strongest beam $b_{i_{max}}$ and SU-MIMO hypothesis. I+N denotes the interference from neighboring cells plus the noise. K is the total number of UEs co-scheduled in the MU-MIMO UE pairing, and $\Sigma_{j \neq i}RBP_k(j, i)$ is the sum RBP of beams for paired UEs relative to the beam ($b_i$) selected for $UE_k$. Note that the RBPs for $UE_k$'s MU-MIMO SINR calculation are derived from $UE_k$, instead of the RBPs of paired UEs, except for the beam indexes used for paired UEs.

The factor 1/K represents the transmit power split due to co-scheduled transmission with K UEs at same time. $RBP_k(i)$ represents SINR back-off if selecting the non-strongest beam for MU-MIMO transmission for $UE_k$. Then, the SU-MIMO SINR for $UE_k$ with power-split and back-off can be denoted by:

$$SINR^{(SU+PS+BF)}(k) = SINR^{(SU)}(k) \times RBP_k(i)/K.$$

Then, MU-SINR of $UE_k$ for MU-MIMO transmission can be further expressed by:

$$SINR^{(MU)}(k) = \frac{SINR^{(SU+PS+BF)}(k)}{1 + SINR^{(SU+PS+BF)}(k) \times \Sigma_{j \neq i}RBP_k(j, i)}$$

In dB domain:

$$SINR^{(MU)}(k)(dB)=SINR^{(SU+PS+BF)}(k)(dB)+\text{Penaty}(dB)$$

where $$SINR^{(SU+PS+BF)}(k)(dB)=SINR^{(SU)}(k)(dB)+10\times\log 10(1/K)+RBP_k(i)(dB)$$

where $$\text{Penaty}(dB)=-10\times\log 10(1+SINR^{(SU+PS+BF)}(k)\times \sum_{j=i}RBP_k(i,j)).$$

Optionally, the network node performs the DL MU-MIMO transmission using the MU-MIMO SINRs computed for the UEs in the MU-MIMO UE pairing (step 606). For example, for each UE in the MU-MIMO UE pairing, the network node performs link adaptation for that UE using the MU-MIMO SINR computed for that UE.

Figure 7:
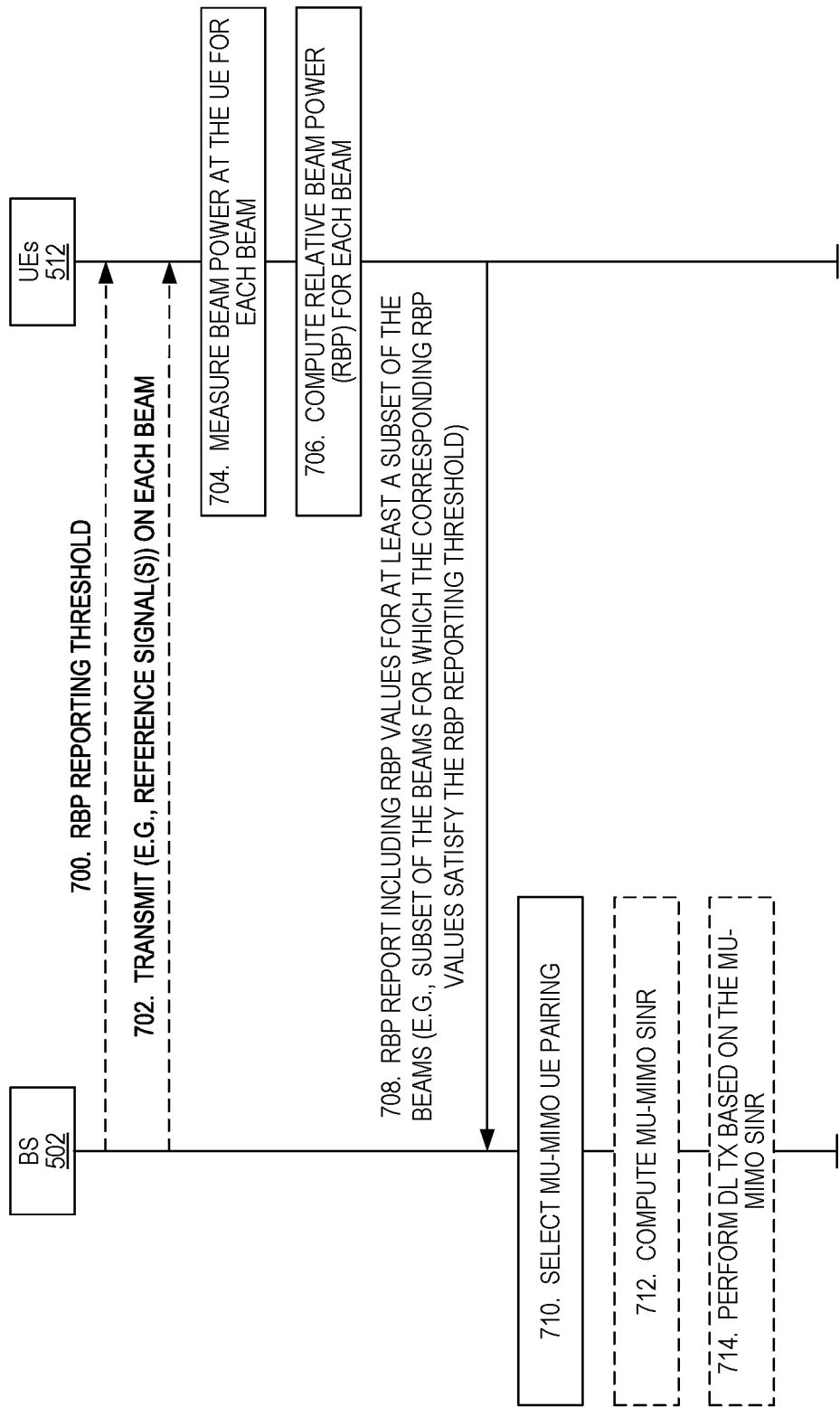
FIGS. 7 through 9 are diagrams that illustrate example mechanisms by which the base station can obtain the relative beam power values for the UEs in step 600 of FIG. 6 in accordance with some embodiments of the present disclosure.
Figure 8:
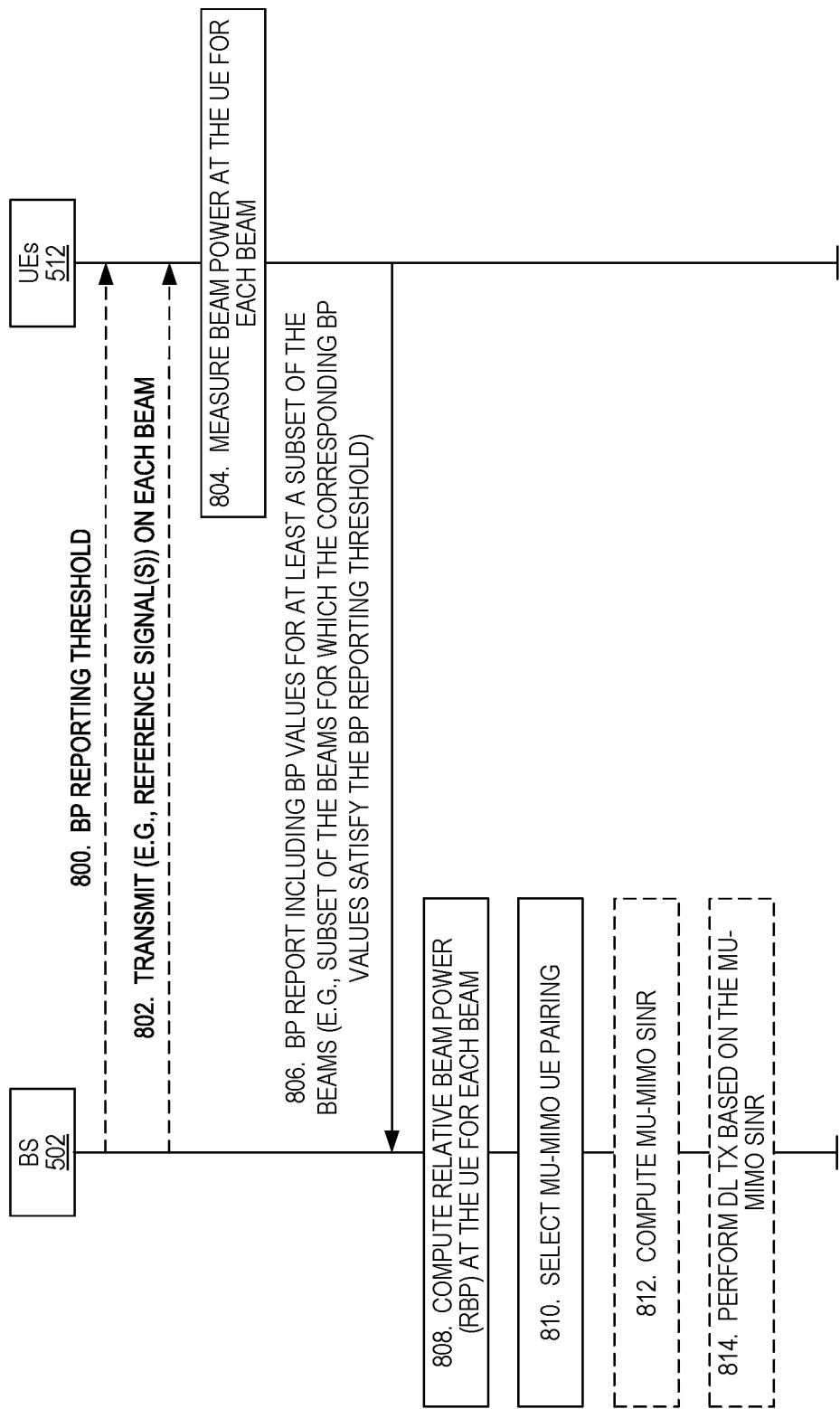
Figure 9:
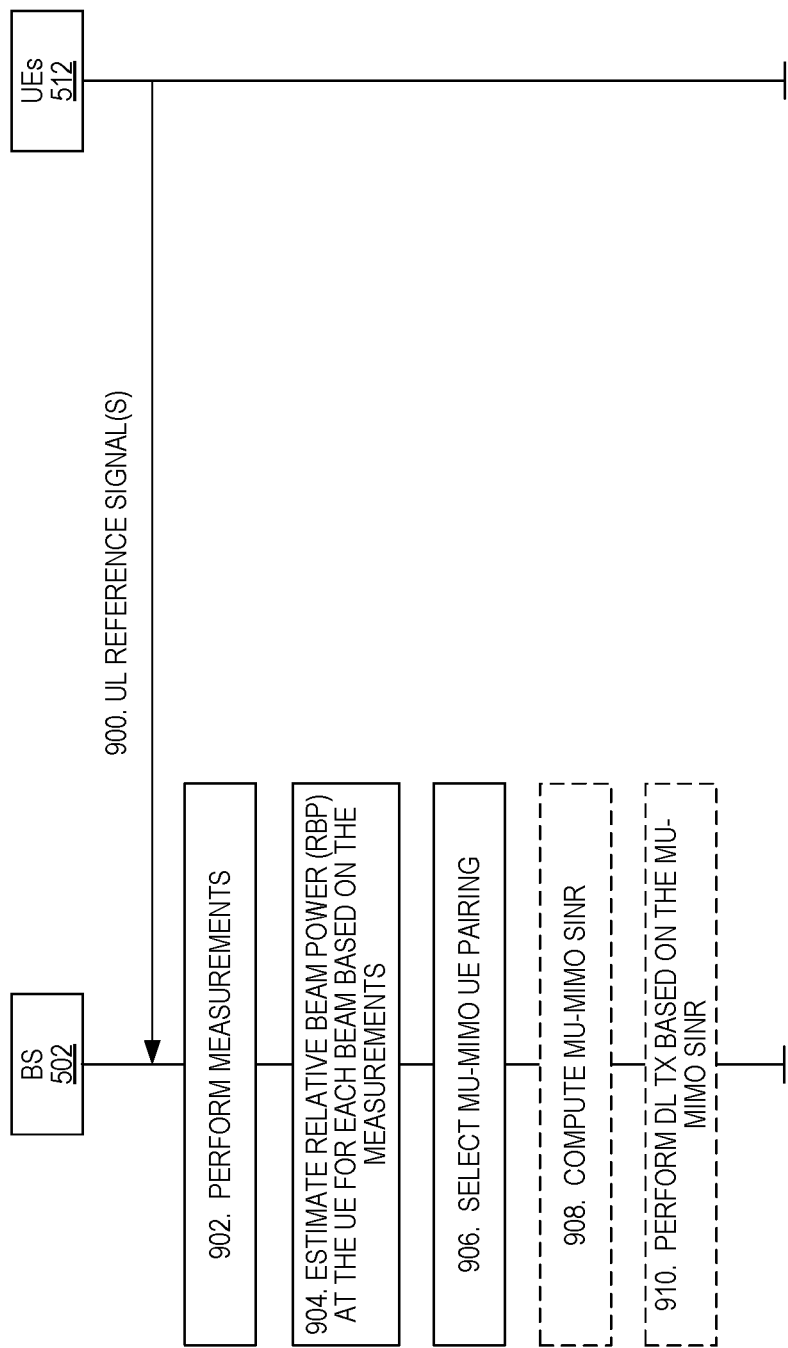

FIGS. 7 through 9 are diagrams that illustrate example mechanisms by which the network node can obtain the RBP values for the UEs in step 600 of FIG. 6 in accordance with some embodiments of the present disclosure. Optional steps are represented by dashed lines and dashed boxes. In these examples, the network node is a base station 502, and the UEs are UEs 512. Looking first at FIG. 7, in this embodiment, the base station 502 receives RBP reports from the UEs 512. More specifically, the base station 502 optionally configures the UEs 512 with a RBP reporting threshold (step 700). The base station 502 transmits reference signals on each of multiple beams available for downlink transmission at the base station 502 (step 702). Each UE 512 measures beam power at the UE 512 for each beam (step 704) and computes a RBP value for each beam relative to a strongest beam at the UE 512 (step 706). Thus, the computed RBP values in this example are the RPB values ($RBP_k(i)$ for each i-th beam relative to the strongest beam $b_{i_{max}}$ at the UE 512, denoted at $UE_k$), as defined in Equation 2 above. Each UE 512 sends a RBP report including at least a subset of the computed RBP values to the base station 502 (708). In some embodiments, the UEs 512 report all computed RBP values (i.e., RBP values for all beams). In some other embodiments, the UEs 512 report only those computed RBP values that satisfy the RBP reporting threshold (e.g., are greater than the RBP reporting threshold).

At this point, the base station 502 has obtained the RBP values from the UEs 512, and the base station 502 proceeds as described above with respect to FIG. 6. Specifically, the base station 502 selects a MU-MIMO UE pairing for a DL MU-MIMO transmission based on the RBP values as described above with respect to step 602 of FIG. 6 (step 710). Optionally, the base station 502 also computes a MU-MIMO SINR for each UE 512 in the selected MU-MIMO UE pairing as described above with respect to step 604 (step 712). The base station 502 optionally performs the DL MU-MIMO transmission based on the MU-MIMO SINRs as described above with respect to step 606 of FIG. 6 (step 714). Step 714 is optional because, e.g., the MU-MIMO UE paring may be selected by a network node other than the network that performs the DL MU-MIMO transmission.

Now turning to FIG. 8, in this embodiment, the base station 502 receives Beam Power (BP) reports from the UEs 512. More specifically, the base station 502 optionally configures the UEs 512 with a BP reporting threshold (step 800). The base station 502 transmits reference signals on each of multiple beams available for DL transmission at the base station 502 (step 802). Each UE 512 measures beam power at the UE 512 for each beam (step 804). Each UE 512 sends a BP report including at least a subset of the measured BP values to the base station 502 (step 806). In some embodiments, the UEs 512 report all measured BP values (i.e., BP values for all beams). In some other embodiments, the UEs 512 report only those measured BP values that satisfy the BP reporting threshold (e.g., are greater than the BP reporting threshold). For each UE 512, the base station 502 computes RBP value(s) for each beam (step 808). In some embodiments, for each UE 512, the base station 502 compute an $RBP_k(i)$ value for each i-th beam relative to the strongest beam $b_{i_{max}}$ at the UE 512, denoted as $UE_k$. In some other embodiments, for each UE 512 denoted as $UE_k$, the base station 502 uses the reported BP values (i.e., $P_k$ values) to compute $RBP_k(i, j)$ values for each combination of i and j in accordance with Equation (1) above.

At this point, the base station 502 has obtained the RBP values from the UEs 512, and the base station 502 proceeds as described above with respect to FIG. 6. Specifically, the base station 502 selects a MU-MIMO UE pairing for a DL MU-MIMO transmission based on the RBP values in accordance with Equation (5), as described above with respect to step 602 of FIG. 6 (step 810). Optionally, the base station 502 also computes a MU-MIMO SINR for each UE 512 in the selected MU-MIMO UE pairing as described above with respect to step 604 (step 812). The base station 502 optionally performs the DL MU-MIMO transmission based on the MU-MIMO SINRs as described above with respect to step 606 of FIG. 6 (step 814).

Now turning to FIG. 9, in this embodiment, the base station 502 computes the RBP values for the UEs 512 based on measurements made at the base station 502. More specifically, each UE 512 transmits uplink (UL) reference signals (e.g., DMRS or SRS in a Time Division Duplexing (TDD) system) (step 900). The base station 502 performs measurements on the UL reference signals from the UEs 512 (step 902). More specifically, for each $UE_k$, the base station 502 measures a power per beam for each beam, where the power per beam for $UE_k$ for beam $b_i$ is denoted as $P_k(i)$ and can be expressed as:

$$P_k(i)=w_i^H R_k w_j$$

where $w_i$ is the precoding vector of i-th beam, and $R_k$ is the covariance matrix of $UE_k$ measured with UL reference signals (e.g., DMRS or SRS). Then, the RBP of each beam i relative to beam j is calculated with Equation (1) (step 904).

At this point, the base station 502 has obtained the RBP values from the UEs 512, and the base station 502 proceeds as described above with respect to FIG. 6. Specifically, the base station 502 selects a MU-MIMO UE pairing for a DL MU-MIMO transmission based on the RBP values as described above with respect to step 602 of FIG. 6 (step 906). Optionally, the base station 502 also computes a MU-MIMO SINR for each UE 512 in the selected MU-MIMO UE pairing as described above with respect to step 604 (step 908). The base station 502 optionally performs the DL MU-MIMO transmission based on the MU-MIMO SINRs as described above with respect to step 606 of FIG. 6 (step 910).

Figure 10:
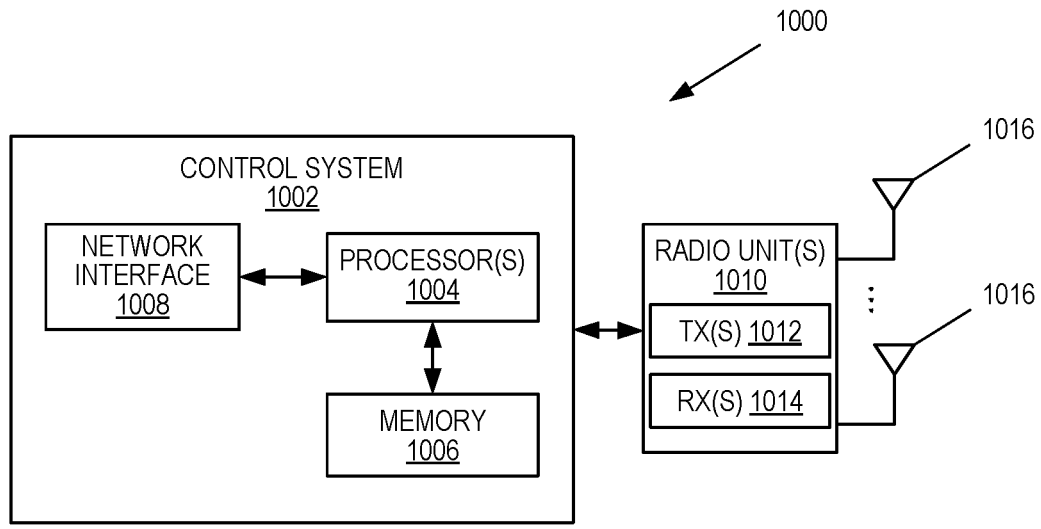
FIG. 10 is a schematic block diagram of a radio access node according to some embodiments of the present disclosure.

FIG. 10 is a schematic block diagram of a radio access node 1000 according to some embodiments of the present disclosure. The radio access node 1000 may be, for example, a base station 502 or 506. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 includes one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 (e.g., the functions of a base station or a network node) as described herein, e.g., with respect of FIGS. 6 through 9. In some embodiments, the function(s) are implemented in software that is stored, e.g., in the memory 1006 and executed by the one or more processors 1004.

Figure 11:
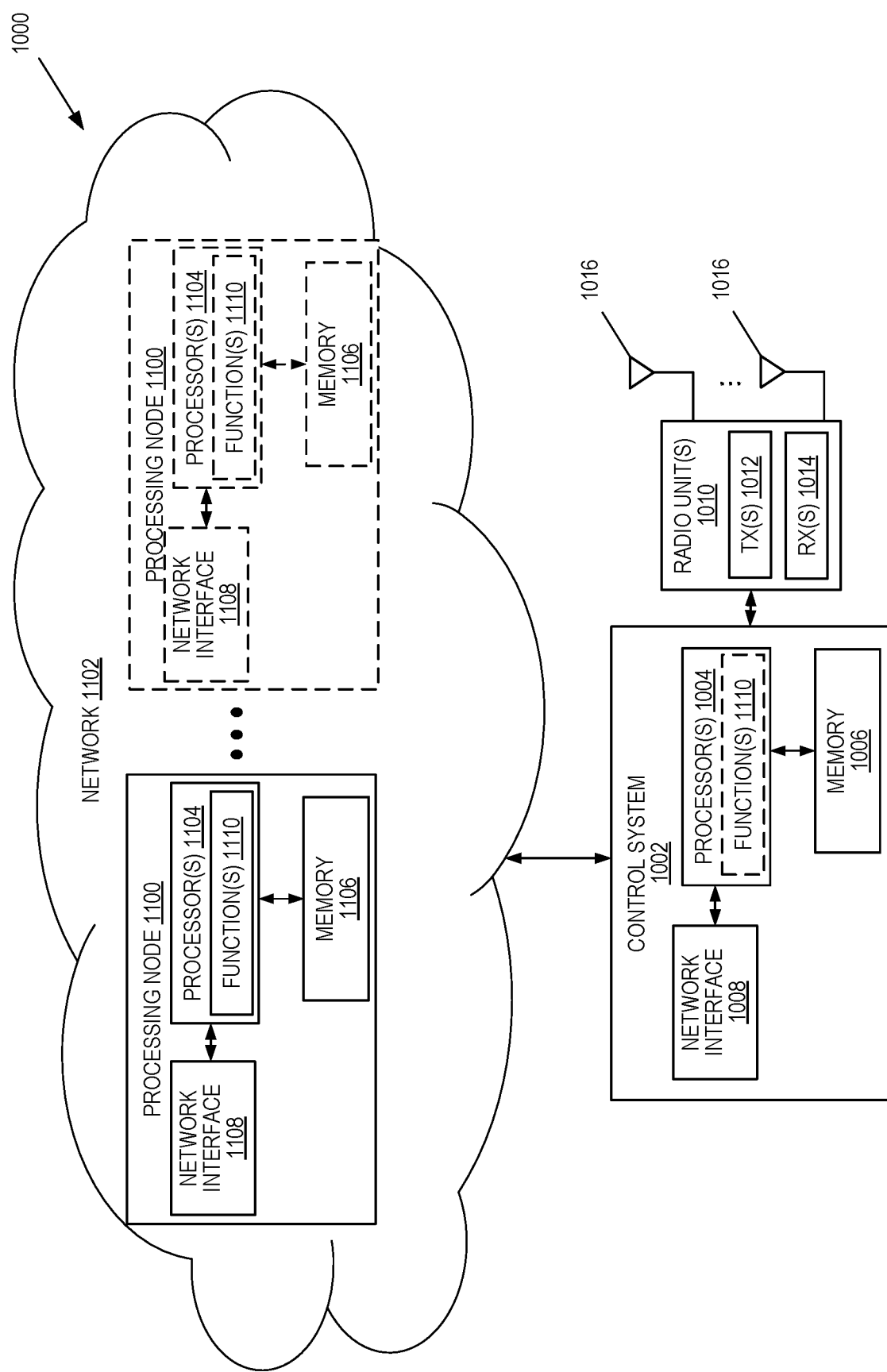
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 includes the control system 1002 that includes the one or more processors 1004 (e.g., CPUs, ASICs, FPGAs, and/or the like), the memory 1006, and the network interface 1008 and the one or more radio units 1010 that each includes the one or more transmitters 1012 and the one or more receivers 1014 coupled to the one or more antennas 1016, as described above. The control system 1002 is connected to the radio unit(s) 1010 via, for example, an optical cable or the like. The control system 1002 is connected to one or more processing nodes 1100 coupled to or included as part of a network(s) 1102 via the network interface 1008. Each processing node 1100 includes one or more processors 1104 (e.g., CPUs, ASICs, FPGAs, and/or the like), memory 1106, and a network interface 1108.

In this example, functions 1110 of the radio access node 1000 (e.g., the functions of a base station or a network node) as described herein, e.g., with respect of FIGS. 6 through 9 are implemented at the one or more processing nodes 1100 or distributed across the control system 1002 and the one or more processing nodes 1100 in any desired manner. In some particular embodiments, some or all of the functions 1110 of the radio access node 1000 (e.g., the functions of a base station or a network node) as described herein, e.g., with respect of FIGS. 6 through 9 are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
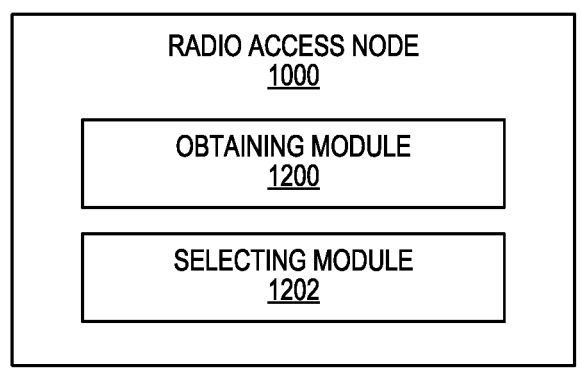
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 (e.g., the functions of a base station or a network node) as described herein, e.g., with respect of FIGS. 6 through 9. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
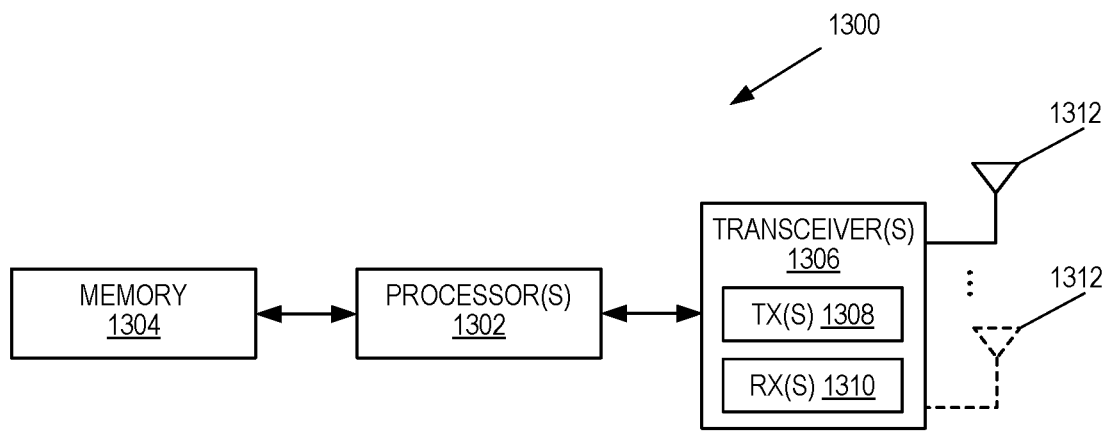
FIG. 13 is a schematic block diagram of a UE according to some embodiments of the present disclosure.

FIG. 13 is a schematic block diagram of a UE 1300 according to some embodiments of the present disclosure. As illustrated, the UE 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the UE 1300 (e.g., the functions of a UE) as described herein, e.g., with respect of FIGS. 6 through 9, may be fully or partially implemented in software that is, e.g., stored in the memory 1304 and executed by the processor(s) 1302. Note that the UE 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the UE 1300 and/or allowing output of information from the UE 1300), a power supply (e.g., a battery and associated power circuitry), etc.

In some embodiments, a computer program including instructions which, when executed by at least one processor, causes the at least one processor to carry out the functionality of the UE 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
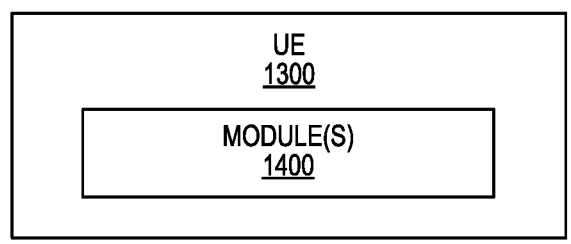
FIG. 14 is a schematic block diagram of the UE of FIG. 13 according to some other embodiments of the present disclosure.

FIG. 14 is a schematic block diagram of the UE 1300 according to some other embodiments of the present disclosure. The UE 1300 includes one or more modules 1400, each of which is implemented in software. The module(s) 1400 provide the functionality of the UE 1300 described herein.

Figure 15:
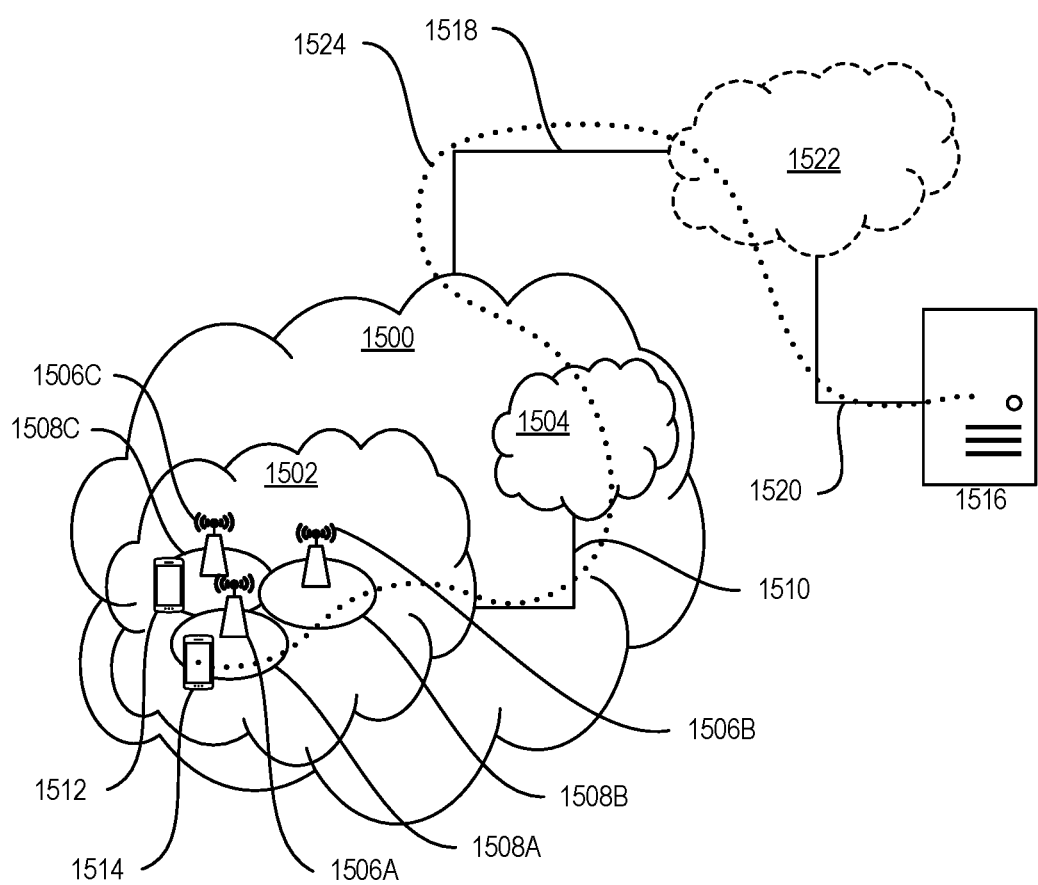
FIG. 15 illustrates a telecommunication network connected via an intermediate network to a host computer in accordance with some embodiments of the present disclosure.

With reference to FIG. 15, in accordance with an embodiment, a communication system includes a telecommunication network 1500, such as a 3GPP-type cellular network, which comprises an access network 1502, such as a Radio Access Network (RAN), and a core network 1504. The access network 1502 comprises a plurality of base stations 1506A, 1506B, 1506C, such as NBs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer 1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
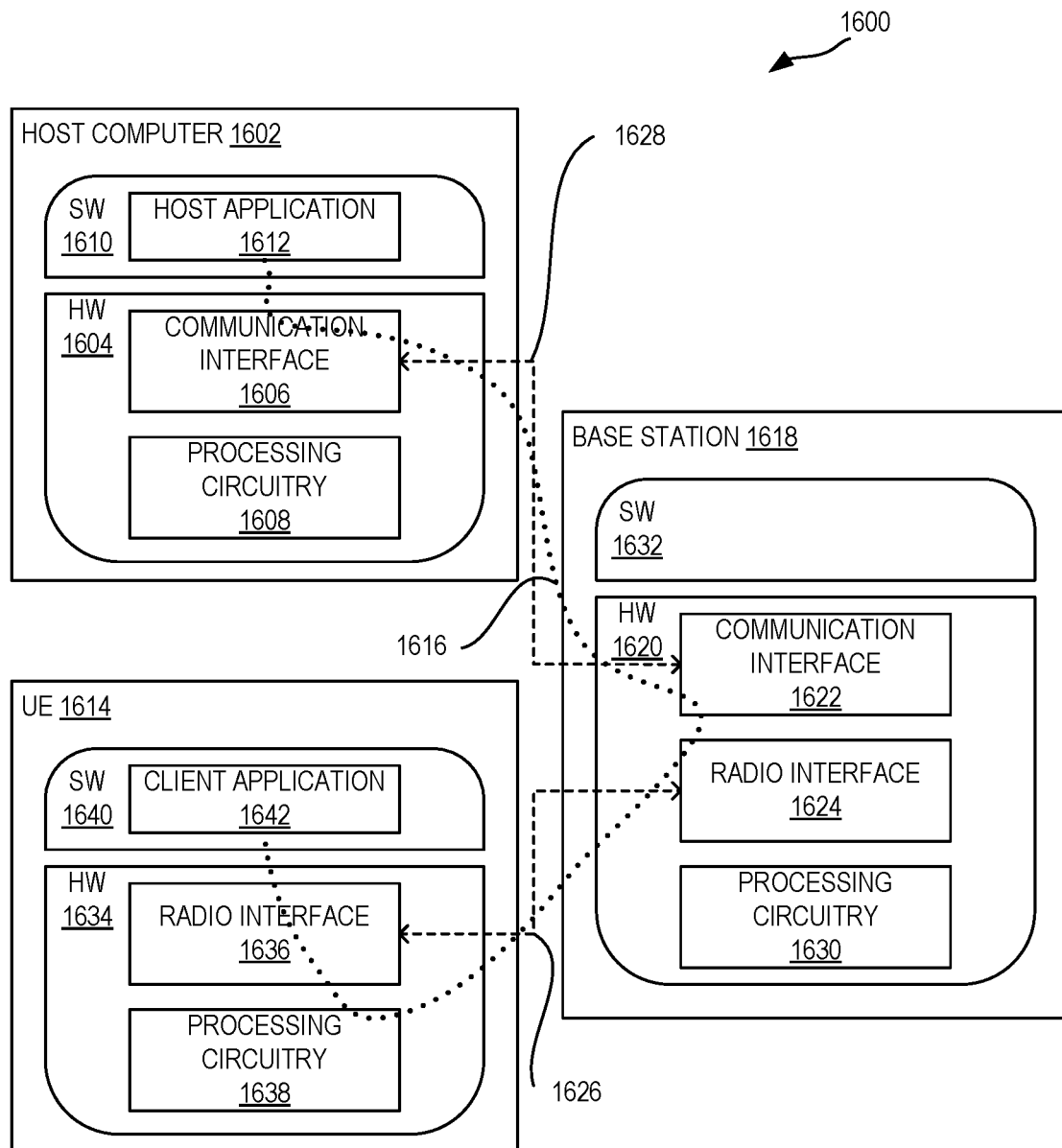
FIG. 16 is a generalized block diagram of a host computer communicating via a base station with a UE over a partially wireless connection in accordance with some embodiments of the present disclosure.

It is noted that the host computer 1602, the base station 1618, and the UE 1614 illustrated in FIG. 16 may be similar or identical to the host computer 1516, one of the base stations 1506A, 15068, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment. More precisely, the teachings of these embodiments may improve e.g., data rate, latency, and/or power consumption and thereby provide benefits such as e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer's 1602 measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

Figures 17, 18:
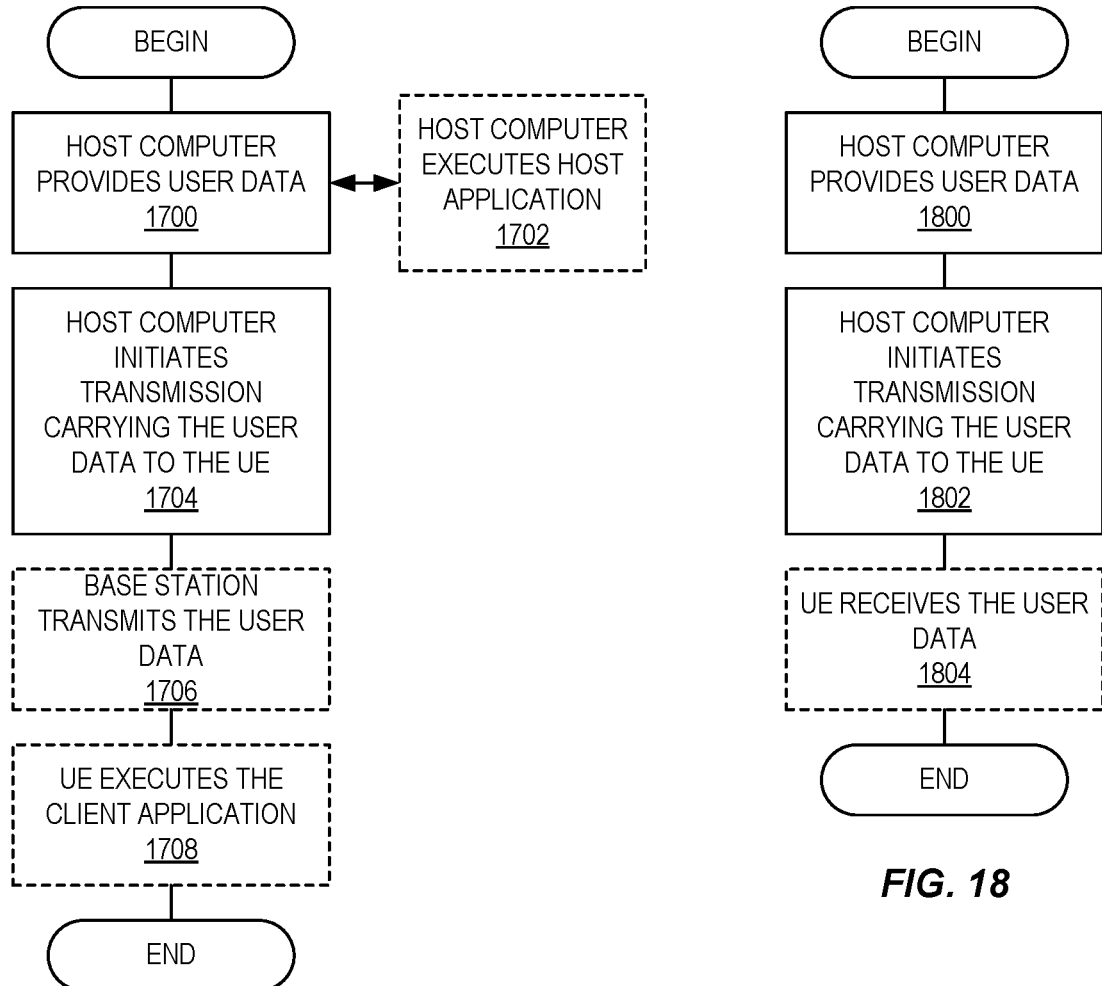
FIG. 17 is a flowchart illustrating a method implemented in a communication system in accordance with one embodiment of the present disclosure.
FIG. 18 is a flowchart illustrating a method implemented in a communication system in accordance with one embodiment of the present disclosure.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
AAS Active Antenna System
AP Access Point
ASIC Application Specific Integrated Circuit
BP Beam Power
CPU Central Processing Unit
CQI Channel Quality Indication
CSI Channel State Information dB Decibel
DFT Discrete Fourier Transform
DL Downlink
DMRS Demodulation Reference Signal
DSP Digital Signal Processor
eNB Enhanced or Evolved Node B
FD-MIMO Full Dimension Multiple Input Multiple Output
FPGA Field Programmable Gate Array
gNB New Radio Base Station
LOS Line of Sight
LTE Long Term Evolution
MME Mobility Management Entity
M-MIMO Massive Multiple Input Multiple Output
MMSE Minimum Mean Square Error
MTC Machine Type Communication
MU Multi-User
MU-MIMO Multi-User Multiple Input Multiple Output
NR New Radio
OTT Over-the-Top
P-GW Packet Data Network Gateway
PMI Precoding Matrix Index
RAM Random Access Memory
RAN Radio Access Network
ROM Read Only Memory
RRH Remote Radio Head
SCEF Service Capability Exposure Function
SINR Signal to Interference plus Noise Ratio
SRS Sounding Reference Signal
SU-MIMO Single User Multiple Input Multiple Output
TDD Time Division Duplexing
UE User Equipment
UL Uplink
ZF Zero-Forcing Those skilled in the art will recognize improvements and modifications to the embodiments of the present disclosure. All such improvements and modifications are considered within the scope of the concepts disclosed herein.

What is claimed is:

1. A method performed in a base station of a cellular communications system to perform downlink scheduling for Multi-User Multiple Input Multiple Output, MU-MIMO, comprising:
    for each User Equipment, UE, of a plurality of UEs considered for MU-MIMO UE pairing, obtaining a relative beam power at the UE for each of a plurality of beams, the relative beam power at the UE for each beam being a value that represents a relative beam power of the beam at the UE relative to a beam power of a strongest of the plurality of beams at the UE; and
    selecting a MU-MIMO UE pairing based on the relative beam powers obtained for the plurality of UEs, the MU-MIMO UE pairing comprising a set of UEs $\{UE_1, \ldots, UE_N\}$ on a respective set of beams $\{b_1, \ldots, b_N\}$, where N is an integer greater than 1, the set of UEs $\{UE_1, \ldots, UE_N\}$ is a subset of the plurality of UEs considered for the MU-MIMO UE pairing, and the set of beams $\{b_1, \ldots, b_N\}$ is a subset of or all of a plurality of beams available for downlink transmission at the base station.

2. The method of claim 1, wherein, for each UE of the plurality of UEs-, obtaining the relative beam power at the UE for each of the plurality of beams comprises receiving-, from the UE-, the relative beam power at the UE for each of the plurality of beams.

3. The method of claim 1, wherein, for each UE of the plurality of UEs, obtaining the relative beam power at the UE for each of the plurality of beams comprises receiving, from the UE, the relative beam power at the UE for each of a subset of the plurality of beams.

4. The method of claim 3, wherein, for each UE of the plurality of UEs, the subset of the plurality of beams for which the relative beam powers are obtained from the UE are those beams for which the relative beam power is greater than a reporting threshold.

5. The method of claim 1, wherein, for each UE of the plurality of UEs, obtaining the relative beam power at the UE for each of the plurality of beams further comprises setting the relative beam power for each of the plurality of beams other than those comprised in the subset of the plurality of beams to a default value.

6. The method of claim 1, wherein, for each UE of the plurality of UEs, obtaining the relative beam power at the UE for each of the plurality of beams comprises:
    receiving, from the UE, beam powers measured at the UE for at least a subset of the plurality of beams, respectively; and
    computing-, for the UE, the relative beam powers for the plurality of beams based on the beam powers measured at the UE.

7. The method of claim 1, wherein, for each UE of the plurality of UEs considered for MU-MIMO UE pairing, obtaining the relative beam power at the UE for each of the plurality of beams comprises:
    obtaining measurements at the base station of uplink reference signals transmitted by the UE; and
    estimating beam powers at the UE for each of the plurality of beams based on measurements.

8. The method of claim 1, wherein selecting the MU-MIMO UE pairing comprises selecting the MU-MIMO UE pairing such that each pair of UEs, $UE_k$ and $UE_n$, in the set of UEs $\{UE_1, \ldots, UE_N\}$ satisfies:

$$RBP_k(i,j) > Th \text{ and } RBP_n(j,i) > Th$$

where:

$$RBP_k(i,j) = \frac{RBP_k(i)}{RBP_k(j)} \text{ and } RBP_n(j,i) = \frac{RBP_n(j)}{RBP_n(i)}$$

and:
    $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
    $RBP_k(j)$ is the relative beam power at the $UE_k$ for the beam, $b_j$, selected for the $UE_n$ in the MU-MIMO UE pairing relative to the beam power of the strongest of the plurality of beams at the $UE_k$;
    $RBP_n(j)$ is the relative beam power at the $UE_n$ for the beam, $b_j$, selected for the $UE_n$ in the MU-MIMO UE pairing relative to the beam power of the strongest of the plurality of beams at the $UE_n$;
    $RBP_n(i)$ is the relative beam power at the $UE_n$ for the beam, $b_i$, selected for the $UE_k$ in the MU-MIMO UE pairing relative to the beam power of the strongest of the plurality of beams at the $UE_n$; and
    Th is a predefined threshold value.

9. The method of claim 1, further comprising calculating a MU-MIMO Signal to Interference plus Noise Ratio, SINR, for a k-th UE in the set of UEs $\{UE_1, \ldots, UE_N\}$ in the MU-MIMO UE pairing based on a Single-User Multiple Input Multiple Output, SU-MIMO, SINR for the k-th UE and a Relative Beam Power, RBP, sum value for the k-th UE; wherein:

the RBP sum value for the k-th UE, $UE_k$, is defined as:

$$\sum_{j \ne i} RBP_k(j, i)$$

where $$RBP_k(j, i) = \frac{RBP_k(j)}{RBP_k(i)}$$

and:
- $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$; and
- $RBP_k(j)$ is the relative beam power at the $UE_k$ for the beam, $b_j$, selected for the $UE_n$ in the MU-MIMO UE pairing relative to the beam power of the strongest of the plurality of beams at the $UE_k$.

10. The method of claim 9, further comprising performing link adaptation for the k-th UE in the MU-MIMO UE pairing based on the calculated MU-MIMO SINR for the k-th UE in the MU-MIMO UE pairing.

11. The method of claim 1, further comprising calculating a MU-MIMO Signal to Interference plus Noise Ratio, SINR, for a k-th UE in the set of UEs $\{UE_1, \ldots, UE_N\}$ in the MU-MIMO UE pairing based on a Single-User Multiple Input Multiple Output, SU-MIMO, SINR for the k-th UE and a Relative Beam Power, RBP, sum value for the k-th UE in accordance with:

$$SINR^{(MU)}(k) = \frac{SINR^{(SU)}(k) \times RBP_k(i)/K}{1 + SINR^{(SU)}(k) \times RBP_k(i) \times \sum_{j \ne i} RBP_k(j, i)/K}$$

where the RBP sum value for the k-th UE, $UE_k$, is defined as:

$$\sum_{j \ne i} RBP_k(j, i)$$

and $$RBP_k(j, i) = \frac{RBP_k(j)}{RBP_k(i)}$$

where:
- $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
- $RBP_k(j)$ is the relative beam power at the $UE_k$ for the beam, $b_j$, selected for the $UE_n$ in the MU-MIMO UE pairing relative to the beam power of the strongest of the plurality of beams at the $UE_k$;
- $SINR^{(SU)}(k)$ is a SU-MIMO SINR for the k-th UE, and K is a total number of UEs in the MU-MIMO UE pairing.

12. A base station for a cellular communications system for performing downlink scheduling for Multi-User Multiple Input Multiple Output, MU-MIMO, the base station comprising a radio interface and processing circuitry whereby the base station is operable to:
- for each User Equipment, UE, of a plurality of UEs considered for MU-MIMO UE pairing, obtain a relative beam power at the UE for each of a plurality of beams, the relative beam power at the UE for each beam being a value that represents a relative beam power of the beam at the UE relative to a beam power of a strongest of the plurality of beams at the UE; and
- select a MU-MIMO User Equipment, UE, pairing based on the relative beam powers obtained for the plurality of UEs, the MU-MIMO UE pairing comprising a set of UEs $\{UE_1, \ldots, UE_N\}$ on a respective set of beams $\{b_1, \ldots, b_N\}$, where N is an integer greater than 1, the set of UEs $\{UE_1, \ldots, UE_N\}$ is a subset of the plurality of UEs considered for the MU-MIMO UE pairing, and the set of beams $\{b_1, \ldots, b_N\}$ is a subset of or all of a plurality of beams available for downlink transmission at the base station.

13. The base station of claim 12, wherein in order to, for each UE of the plurality of UEs, obtain the relative beam power at the UE for each of the plurality of beams, the base station is further operable to, via the radio interface and the processing circuitry:
- receive, from the UE, the relative beam power at the UE for each of the plurality of beams.

14. The base station of claim 12, wherein in order to, for each UE of the plurality of UEs, obtain the relative beam power at the UE for each of the plurality of beams, the base station is further operable to, via the radio interface and the processing circuitry:
- receive, from the UE, the relative beam power at the UE for each of a subset of the plurality of beams.

15. The base station of claim 14, wherein, for each UE of the plurality of UEs, the subset of the plurality of beams for which the relative beam powers are obtained from the UE are those beams for which the relative beam power is greater than a predefined or preconfigured reporting threshold.

16. The base station of claim 14, wherein in order to, for each UE of the plurality of UEs, obtain the relative beam power at the UE for each of the plurality of beams, the base station is further operable to, via the processing circuitry:
- set the relative beam power for each of the plurality of beams other than those comprised in the subset of the plurality of beams to a default value.

17. The base station of claim 12, wherein in order to, for each UE of the plurality of UEs, obtain the relative beam power at the UE for each of the plurality of beams, the base station is further operable to, via the radio interface and the processing circuitry:
- receive, from the UE, beam powers measured at the UE for at least a subset of the plurality of beams, respectively; and
- compute, for the UE, the relative beam powers for the plurality of beams based on the beam powers measured at the UE.

18. The base station of claim 12, wherein in order to, for each UE of the plurality of UEs, obtain the relative beam power at the UE for each of the plurality of beams, the base station is further operable to, via the radio interface and the processing circuitry:
- obtain measurements at the base station of uplink reference signals transmitted by the UE; and
- estimate beam powers at the UE for each of the plurality of beams based on measurements.

19. The base station of claim 12, wherein, in order to select the MU-MIMO UE pairing, the base station is further operable to, via the processing circuitry:
  select the MU-MIMO UE pairing such that each pair of UEs, $UE_k$ and $UE_n$, in the set of UEs $\{UE_1, \ldots, UE_N\}$ satisfies:

$RBP_k(i,j) > Th$ and $RBP_n(j,i) > Th$ where:

$$RBP_k(i,j) = \frac{RBP_k(i)}{RBP_k(j)} \text{ and } RBP_n(j,i) = \frac{RBP_n(j)}{RBP_n(i)}$$

and:
    $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
    $RBP_k(j)$ is the relative beam power at the $UE_k$ for the beam, $b_j$, selected for the $UE_n$ in the MU-MIMO UE pairing relative to the beam power of the strongest of the plurality of beams at the $UE_k$;
    $RBP_n(j)$ is the relative beam power at the $UE_n$ for the beam, $b_j$, selected for the $UE_n$ in the MU-MIMO UE pairing relative to the beam power of the strongest of the plurality of beams at the $UE_n$;
    $RBP_n(i)$ is the relative beam power at the $UE_n$ for the beam, $b_i$, selected for the $UE_k$ in the MU-MIMO UE pairing relative to the beam power of the strongest of the plurality of beams at the $UE_n$; and
    Th is a predefined threshold value.

20. The base station of claim 12, wherein, via the processing circuitry, the base station is further operable to:
  calculate a MU-MIMO Signal to Interference plus Noise Ratio, SINR, for a k-th UE in the set of UEs $\{UE_1, \ldots, UE_N\}$ in the MU-MIMO UE pairing based on a Single-User Multiple Input Multiple Output, SU-MIMO, SINR for the k-th UE and a Relative Beam Power, RBP, sum value for the k-th UE, the RBP sum value for the k-th UE, $UE_k$, being defined as:

$$\sum_{j \neq i} RBP_k(j, i)$$

where:
    $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$; and
    $RBP_k(j)$ is the relative beam power at the $UE_k$ for the beam, $b_j$, selected for the $UE_n$ in the MU-MIMO UE pairing relative to the beam power of the strongest of the plurality of beams at the $UE_k$.

21. The base station of claim 20, wherein, via the radio interface and the processing circuitry, the base station is further operable to:
  perform link adaptation for the k-th UE in the MU-MIMO UE pairing based on the calculated MU-MIMO SINR for the k-th UE in the MU-MIMO UE pairing.

22. The base station of claim 12, wherein, via the processing circuitry, the base station is further operable to:
  calculate a MU-MIMO Signal to Interference plus Noise Ratio, SINR, for a k-th UE in the set of UEs $\{UE_1, \ldots, UE_N\}$ in the MU-MIMO UE pairing based on a Single-User Multiple Input Multiple Output, SU-MIMO, SINR for the k-th UE and a Relative Beam Power, RBP, sum value for the k-th UE in accordance with:

$$SINR^{(MU)}(k) = \frac{SINR^{(SU)}(k) \times RBP_k(i)/K}{1 + SINR^{(SU)}(k) \times RBP_k(i) \times \Sigma_{j \neq i} RBP_k(j, i)/K}$$

where the RBP sum value for the k-th UE, $UE_k$, is defined as:

$$\sum_{j \neq i} RBP_k(j, i)$$

where $$RBP_k(j, i) = \frac{RBP_k(j)}{RBP_k(i)}$$

and:
    $RBP_k(i)$ is the relative beam power at the $UE_k$ for the beam, $b_i$, selected for the $UE_k$ in the MU-MIMO UE pairing relative to the beam power of the strongest of the plurality of beams at the $UE_k$;
    $RBP_k(j)$ is the relative beam power at the $UE_k$ for the beam, $b_j$, selected for the $UE_n$ in the MU-MIMO UE pairing relative to the beam power of the strongest of the plurality of beams at the $UE_k$;
    $SINR^{(SU)}(k)$ is a SU-MIMO SINR for the k-th UE, and K is a total number of UEs in the MU-MIMO UE pairing.

* * * * *